United States Patent
Qin et al.

(10) Patent No.: US 7,333,777 B2
(45) Date of Patent: Feb. 19, 2008

(54) LATCHING ASSEMBLY FOR A REMOVABABLE COVER OF A WIRELESS COMMUNICATION DEVICE

(75) Inventors: Shui Yuan Qin, Shenzhen (CN); Chia-Hua Chen, Tu-chen (TW); Lin Hu, Shenzhen (CN); Qing Ming Huang, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 415 days.

(21) Appl. No.: 10/919,664

(22) Filed: Aug. 16, 2004

(65) Prior Publication Data
US 2005/0037717 A1    Feb. 17, 2005

(30) Foreign Application Priority Data
Aug. 15, 2003   (TW) .............................. 92214815 U

(51) Int. Cl.
*H04B 1/38*   (2006.01)

(52) U.S. Cl. .................. 455/90.3; 455/575.1; 455/128; 455/90.1; 455/575.3; 455/575.4; 455/575.8; 455/347; 379/330; 379/425; 320/114; 248/309.1; 248/316.8

(58) Field of Classification Search ............... 455/90.3, 455/575.1, 128, 90.1, 575.3, 575.4, 347; 379/330, 425; 320/114; 248/309.1, 316.8
See application file for complete search history.

(56) References Cited

U.S. PATENT DOCUMENTS

| | | | | |
|---|---|---|---|---|
| 5,028,083 | A | * | 7/1991 | Mischenko .................. 292/175 |
| 5,848,152 | A | * | 12/1998 | Slipy et al. ............ 379/433.13 |
| 5,869,204 | A | * | 2/1999 | Kottke et al. ................ 429/100 |
| 6,463,263 | B1 | * | 10/2002 | Feilner et al. .............. 455/90.1 |
| 6,549,789 | B1 | * | 4/2003 | Kfoury ...................... 455/550.1 |
| 6,625,425 | B1 | * | 9/2003 | Hughes et al. ............. 455/90.3 |
| 6,660,427 | B1 | * | 12/2003 | Hukill et al. .................. 429/97 |
| 2006/0148539 | A1 | * | 7/2006 | Johnson et al. ........... 455/575.1 |

* cited by examiner

*Primary Examiner*—Lana Le
*Assistant Examiner*—Amar Daglawi
(74) *Attorney, Agent, or Firm*—Wei Te Chung

(57) ABSTRACT

A wireless communication device includes a removable panel (100), a base cover (200) and a latching assembly (300). The removable panel has a first mounting portion (120). The base cover has a second mounting portion (240) corresponding to the first mounting portion of the removable panel. The latching assembly includes a lacking fastener (320) and a coil spring (340), wherein the latching assembly is effective to nail the removable panel into the housing through the first mounting portion and the second mounting portion. Therefore, it is simple, tight and easy for current invention using the latching assembly to fix the removable panel to the base cover, or to disassemble the removable panel away.

19 Claims, 5 Drawing Sheets

LATCHING ASSEMBLY FOR A REMOVABABLE COVER OF A WIRELESS COMMUNICATION DEVICE

BACKGROUND OF THE INVENTION

1. Field of the Invention

The present invention generally relates to the field of wireless communication devices having removable panels, and more particularly to a latching assembly of a wireless communication device for securing a removable panel onto the wireless communication device. The instant invention relates to a contemporarily filed application titled "LATCHING ASSEMBLY FOR REMOVABLE PANEL OF A PORTABLE ELECTRONIC DEVICE" and having the same assignee with the instant application.

2. Prior Art

Removable panels are often provided for wireless communication devices such as mobile phones, to enable users to change the aesthetic appearance of their mobile phones. A user may from time to time want to remove an old panel from a base cover, and install a new fashionable panel on the base cover instead. The new panel must be attached firmly and securely.

Currently, removable panels of wireless communication devices are often fixed on the base covers by means of their own structures. An example is the removable panel of mobile phone model no. OT310 marketed by ALCATEL. A top of the removable panel is bent to define a holding portion, and a hook protrudes from an inner surface of the holding portion. A bottom of the removable panel has two projections, and opposite sides of the removable panel have a plurality of detents. The projections and the detents protrude from a flange of the removable panel. Corresponding to the structure of the removable panel, the base cover defines a notch, two grooves, and a plurality of slots. The notch is located at a top of an engaging surface_of the base cover. The grooves are located at a bottom of the engaging surface. The slots are located at two opposite sides of the engaging surface. In assembly, two projections are first inserted into the grooves and retained therein. The hook is then inserted into the notch, with the detents being received in the slots. The hook is firmly engaged in the notch, and the detents are securely engaged in the slots. Thus the removable panel is firmly fixed to the base cover. In disassembly, the hook is first disengaged from the notch, with the detents being removed from the slots. The projections are then pulled out from two grooves. The removable panel is thus fully_detached from the base cover.

It is important for the removable cover to not only be firmly_retained in the base cover, but also to be easily removed when needed. The removable panel of the above-described mobile phone requires a good deal of force to be applied in order for it to be detached, because of the firm attachment structure as described above. The removable panel is easily damaged if excessive force is applied, both in the process of detaching the removable panel and attaching the removable panel.

Therefore, in order to overcome the above-described problems, a latching assembly for a removable panel of a wireless communication device is desired.

SUMMARY OF THE INVENTION

Accordingly, an object of the present invention is to provide a latching assembly for a removable panel of a wireless communication device; in which the latching assembly has a simple configuration, can firmly attach the removable panel to a base cover of the wireless communication device, and can allow easy detachment of the removable panel from the base cover.

To achieve the above-mentioned object, a wireless communication device of the present invention includes a removable panel, a base cover and a latching assembly. The removable panel has a first mounting portion provided therein. The base cover has a second mounting portion provided therein, corresponding to the first mounting portion. The latching assembly comprises a latching fastener and a coil spring. The latching assembly removably attaches the removable panel to the base cover by compression and decompression of the coil spring, said decompression driving the latching fastener to detachably engage the first mounting portion and the second mounting portion together.

Other objects, advantages and novel features of the invention will become more apparent from the following detailed description when taken in conjunction with the accompanying drawings, in which:

DETAILED DESCRIPTION OF THE INVENTION

Figure 1:
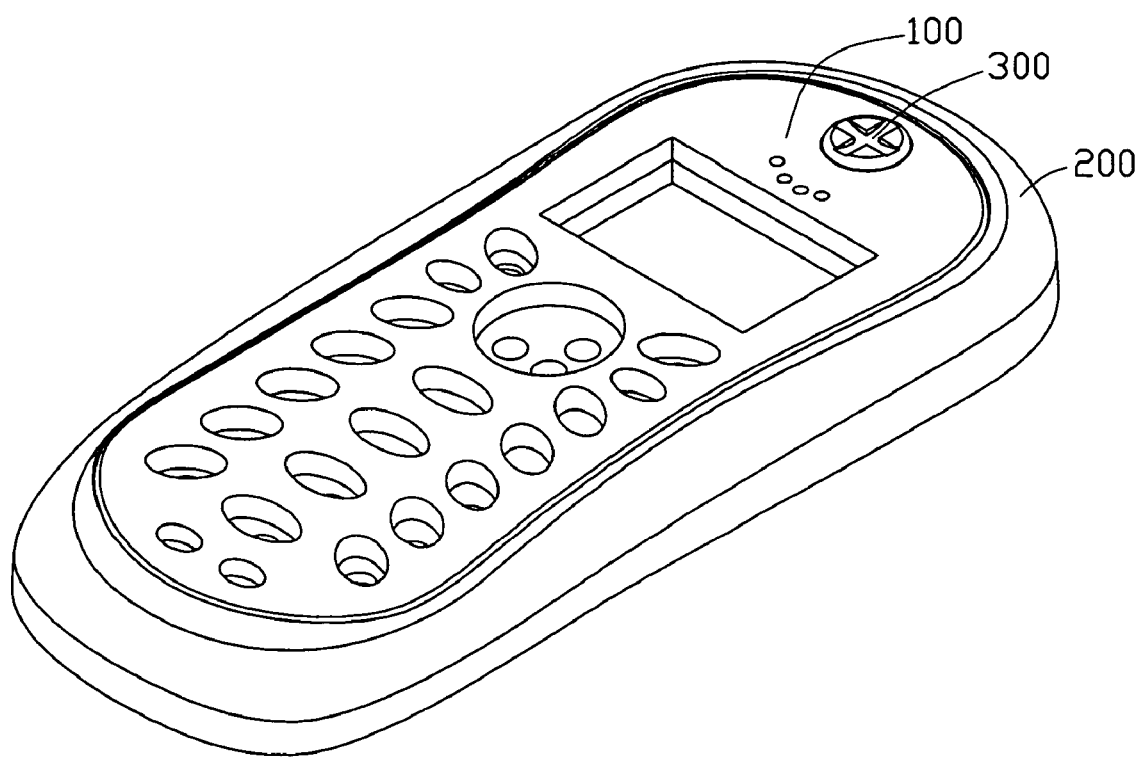
FIG. 1 is an isometric view of a wireless communication device in accordance with a preferred embodiment of the present invention.

A wireless communication device of the present invention is generally shown in FIG. 1 to be a radiotelephone, preferably a cellular telephone operable in a cellular telephone system. Although the radiotelephone is preferably a cellular telephone, one skilled in the art will recognize that the features discussed herein below will also find application in other wireless communication devices such as cordless telephones, wireline telephones, personal digital assistants ("PDAs"), two-way radios, pagers, and the like. Therefore, radiotelephones as described herein shall be construed to include and refer to each of these wireless communication devices and their equivalents.

Referring to FIG. 1, a radiotelephone (not labeled) includes a removable panel 100, a base cover 200 and a latching assembly 300. The removable panel 100 is inserted and firmly retained in the base cover 200 by means of the latching assembly 300. It is to be understood that the position of the latching assembly 300 can be varied to any other suitable location on the radiotelephone.

Figure 2:
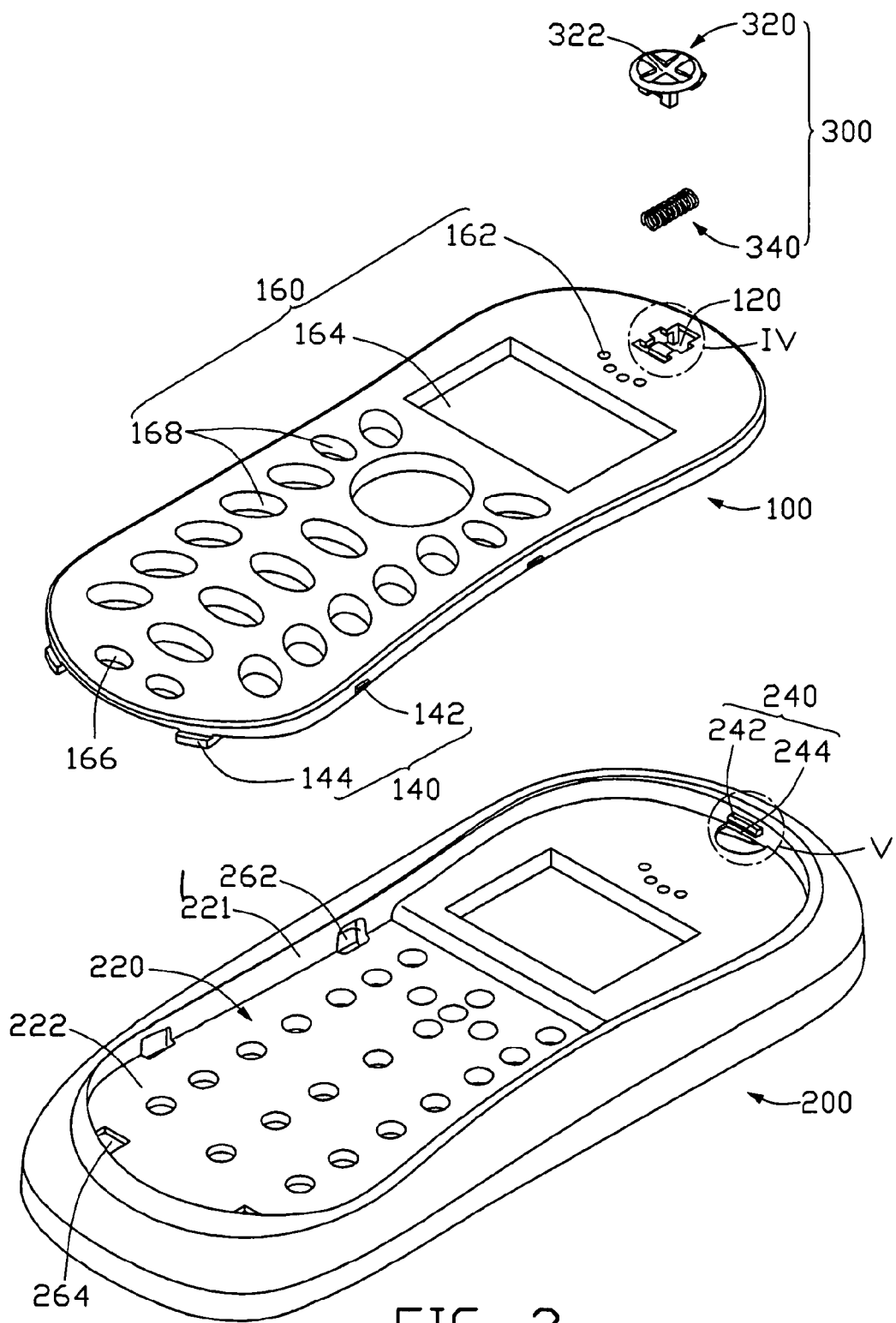
FIG. 2 is an exploded view of FIG. 1.

Referring to FIG. 2, the removable panel 100 comprises a first mounting portion 120 located in a first end portion thereof, a plurality of detents 140 protruding from a peripheral edge portion thereof, and a plurality of holes 160 defined therethough.

Figure 3:
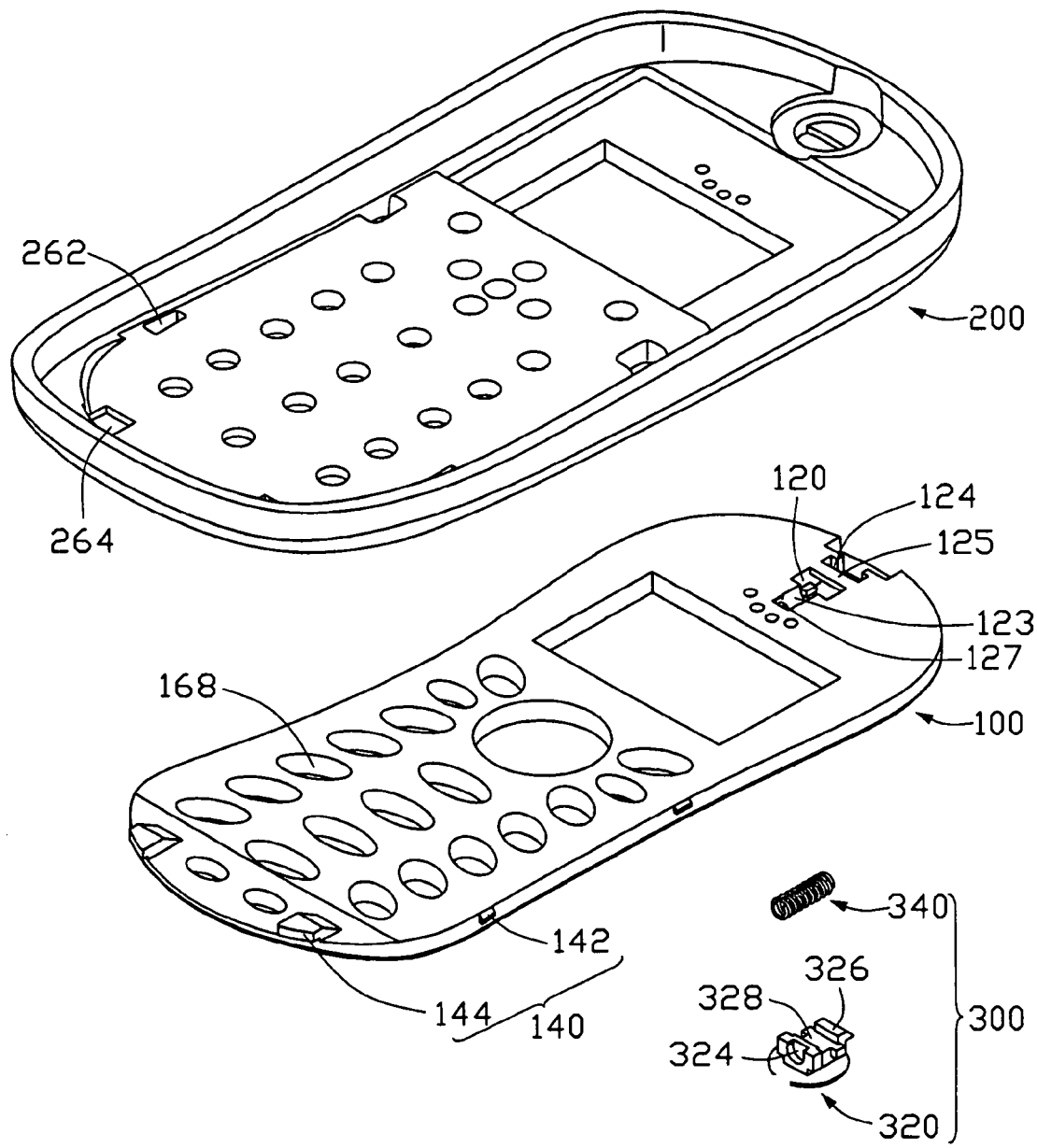
FIG. 3 is an exploded, inverted view of FIG. 1.
Figure 4:
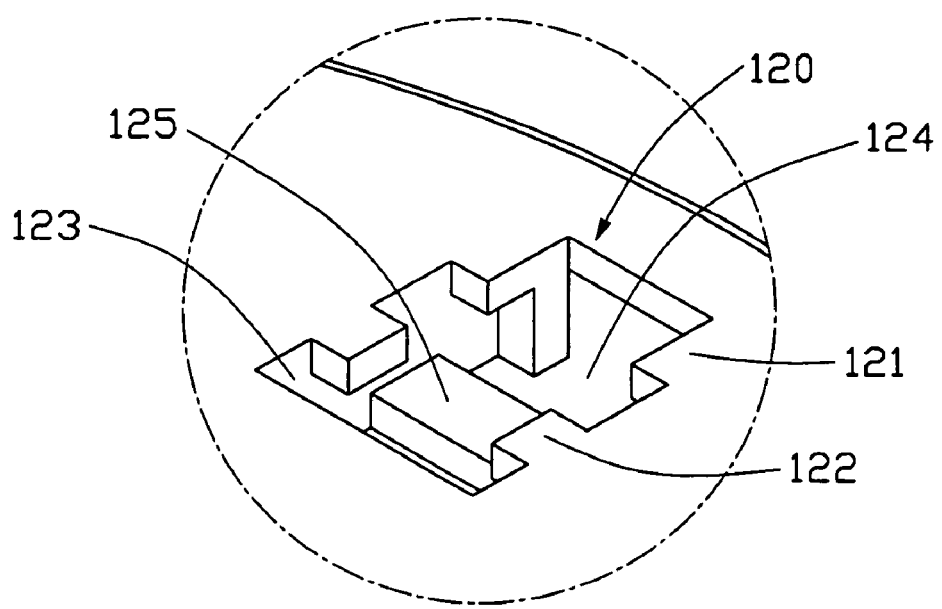
FIG. 4 is an enlarged view of a circled portion IV of FIG. 2.
Figure 5:
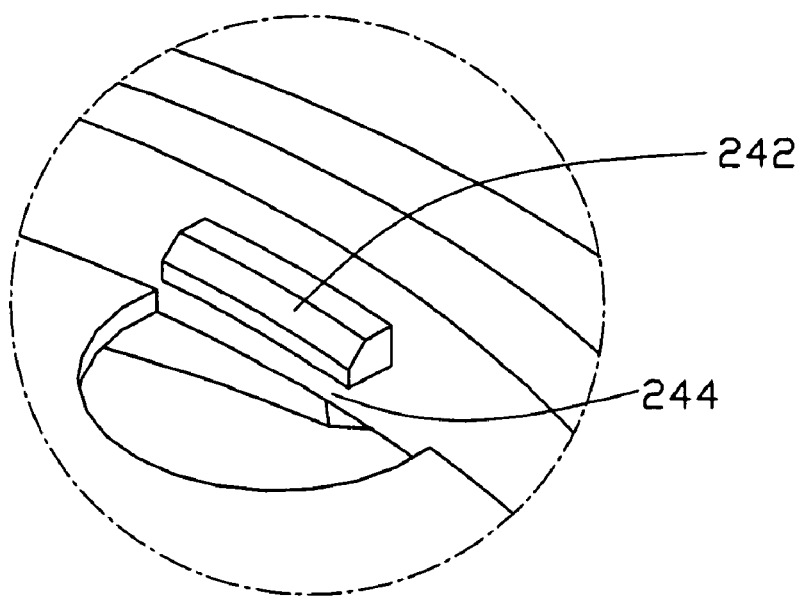
FIG. 5 is an enlarged view of a circled portion V of FIG. 2.

Referring also to FIGS. 3 and 4, the first mounting portion 120 comprises a space defined through the removable panel 100. A transverse crossbeam 125 crosses a bottom of the space, thereby separating the first mounting portion 120 into a first containing portion 124 and an adjoining second containing portion 123. Two opposing projections 121 are formed above the first containing portion 124. Two opposing projections 122 are formed above the second containing portion 123. A post 127 is formed in an end of the second containing portion 123, with a free end of the post 127 pointing directly toward the crossbeam 125.

Again referring to FIG. 2, the detents 140 include a pair of catches 142 located on each of opposite long sides of the removable panel 100, and two latches 144 extending from a second end of the removable panel 100. The holes 160 include a plurality of speaker apertures 162 adjacent the first mounting portion 120, a plurality of microphone apertures 166 located in a second end portion of the removable panel 100, a display window 164 adjacent the speaker apertures 162, and a plurality of keyholes 168 between the display window 164 and the microphone apertures 166.

The base cover 200 includes a peripheral sidewall 221 and a bottom wall 222. The sidewall 221 and the bottom wall 222 cooperatively form a shallow compartment 220 in a top portion of the base cover 200. A beveled projection block 242 extends from the sidewall 221 at the first end of the base cover 200, and protrudes into the compartment 220. A recess 244 is defined under the projection block 242. The projection block 242 and the recess 244 cooperatively define a second mounting portion 240, corresponding to the first mounting portion 120 of the removable panel 100. A pair of catch slots 262 is defined in each of opposite long side portions of the sidewall 221, corresponding to the catches 142 of the removable panel 100. Two latching slots 264 defined in a second end portion of the bottom wall 222, corresponding to the latches 144 of the removable panel 100. It is to be understood that the number of latches 144 and the number of latching slots 264 can be varied according to need.

Referring also to FIG. 3, the latching assembly 300 includes a latching fastener 320 and a coil spring 340. The latching fastener 320 defines a cross-shaped groove 322 in a topmost portion thereof, for facilitating manual operation. The latching fastener 320 also comprises a spring receptacle 324, a wedge 326, and a recessed platform 328 at a main bottom portion thereof. The spring receptacle 324 is part of a block (not labeled) adjacent to a second end of the recessed platform 328. The wedge 326 protrudes from a first end of the recessed platform 328 that is opposite to the second end thereof. The coil spring 340 is a resilient metallic spring.

Figure 6:
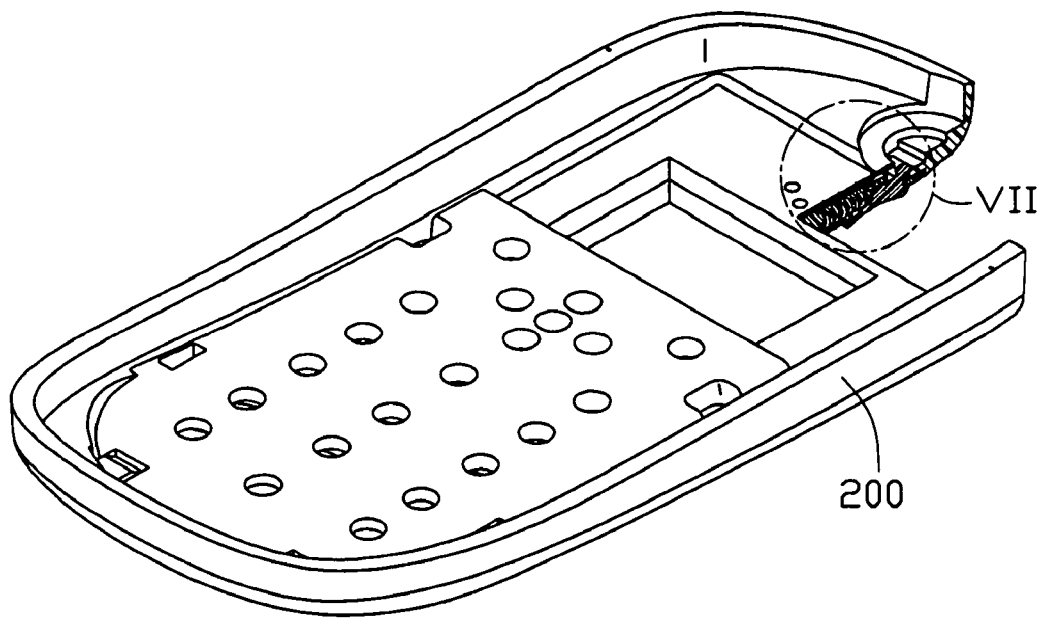
FIG. 6 is a cutaway view of a base cover of the wireless communication device shown in FIG. 3.
Figure 7:
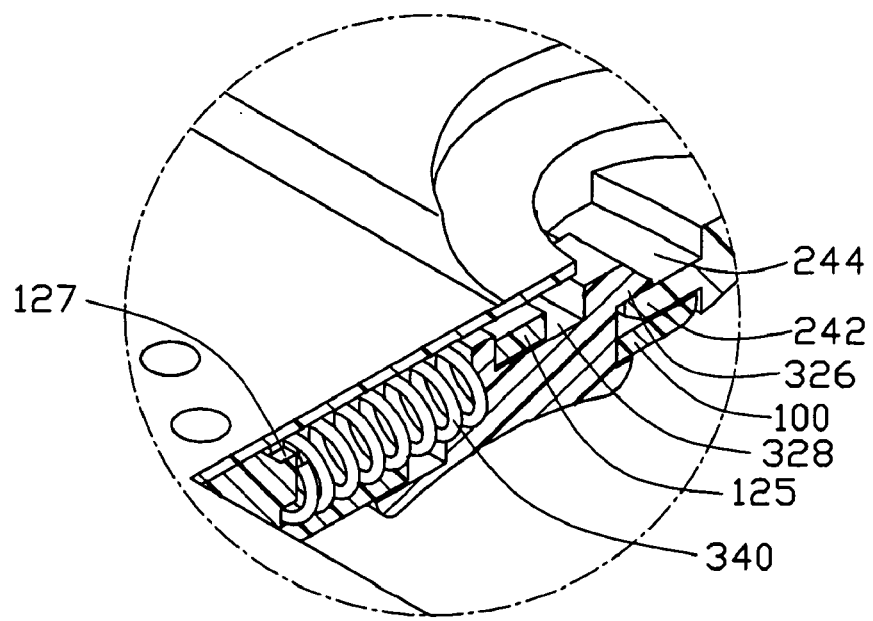
FIG. 7 is an enlarged view of a circled portion VII of FIG. 6.

Referring to FIGS. 3, 6 and 7 together, in assembly, the latching assembly 300 is first assembled in the removable panel 100. The coil spring 340 is put into the second containing portion 123, with a second end of the coil spring 340 surrounding the post 127. Then the latching fastener 320 is pressed down into the first mounting portion 120. The spring receptacle 324 is located in the second containing portion 123, and retains an opposite first end of the coil spring 340. The coil spring 340 is thereby compressed between the removable panel 100 and the spring receptacle 324, and pushes the latching fastener 320 so that the recessed platform 328 is biased against a wall of the first end portion of the removable panel 100 at the first mounting portion 120. The wedge 326 is located in the first containing portion 124.

Second, the combined removable panel 100 and the latching assembly 300 is attached to the base cover 200. The latches 144 of the removable panel 100 are inserted into the latching slots 264 of the base cover 200. The catches 142 are received in the catch slots 262. At this time, the first mounting portion 120 of the removable panel 100 is positioned upon the second mounting portion 240 of the base cover 200, and the combined removable panel 100 and latching assembly 300 is substantially received in the compartment 220 of the base cover 200.

Then the latching fastener 320 is pressed down again. A beveled surface of the wedge 326 rides over the bevel of the projection block 242. The latching fastener 320 is forced slightly away from the first end of the removable panel 100, and the coil spring 340 is further compressed. Eventually the recessed platform 328 reaches and is blocked by the crossbeam 125. In this position, the wedge 326 has completely ridden past the projection block 242, and the coil spring 340 decompresses. The coil spring 340 drives the latching fastener 320 back toward the first end of the removable panel 100, with the recessed platform 328 sliding along the crossbeam 125. Finally, the recessed platform 328 returns to the position in which it is biased against said wall of the first end portion of the removable panel 100 at the first mounting portion 120. In this state, the wedge 326 is received in the recess 244, and is engaged with an underside of the projection block 242. At the same time, opposite protruding portions of the recessed platform 328 are engaged under the projections 121, and the block of the latching fastener 320 is engaged under the projections 122. The coil spring 340 remains compressed, such that the latching assembly 300 securely retains the removable panel 100 on the base cover 200.

In detaching the removable panel 100 from the base cover 200, the process is substantially the reverse of relevant parts of the above-described assembly process. In particular, the latching fastener 320 is pushed away from the first end of the base cover 200, so that the wedge 326 is released from the projection block 242. Then the radiotelephone is turned upside down, allowing the removable panel 100 to disengage from the base cover 200 under force of gravity.

From the above description, it will be apparent that the latching assembly 300 of the present invention provides convenient attachment and detachment of the removable panel 100 to and from the base cover 200.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A wireless communication device, comprising:
a removable panel comprising a first mounting portion defined therein and a crossbeam configured for separating the first mounting portion into a first containing portion and a second containing portion formed thereon;
a housing retaining the removable panel, and comprising a second mounting portion corresponding to the first mounting portion of the removable panel; and
a latching assembly detachably securing the removable panel on the housing, the latching assembly comprising a latching fastener and an elastic member,
wherein the crossbeam is configured for restraining movement of the latching fastener relative to the removable panel, the latching assembly removably attaching the removable panel to the housing by compression and decompression of the elastic member, said decompression driving the latching fastener to detachably engage with the first mounting portion of the removable panel and the second mounting portion of the housing together.

2. The wireless communication device as claimed in claim 1, wherein the and a second containing portion, a post is provided in the second containing portion, and a part of the elastic member is retained around the post.

3. The wireless communication device as claimed in claim 2, wherein The second mounting portion comprises a projection block and a recess, said projection block protrudes from an inner surface of a sidewall of the housing, and said recess is defined under said projection block.

4. The wireless communication device as claimed in claim 1, wherein the removable panel further comprises a plurality of catches on two opposite sides thereof, and at least one latch extending from an end thereof.

5. The wireless communication device as claimed in claim 4, wherein the housing further comprises a compartment retaining the removable panel, the housing defines a plurality of catch slots and at least one latching slot at the compartment, and the catch slots receive the catches and said latching slot receives said latch.

6. The wireless communication device as claimed in claim 3, wherein the latching fastener comprises a receptacle, a wedge, and a platform interconnecting the receptacle and the wedge, the wedge is received in the second containing portion and is engagable with said projection block of the second mounting portion, and another part of the elastic member is retained in The receptacle.

7. The wireless communication device as claimed in claim 1, wherein the elastic member is a resilient metallic spring.

8. The wireless communication device as claimed in claim 1, wherein the latching fastener defines a groove in a top portion thereof, for facilitating manual operation.

9. A latching mechanism, comprising:
   a first mounting portion adapted to be provided in a removable panel of a wireless communication device;
   a second mounting portion adapted to be provided in a base cover of the wireless communication device, the second mounting portion including a beveled projection block; and
   a latching assembly for detachably securing the first mounting portion to the second mounting portion, the latching assembly comprising a latching fastener and an elastic member, the latching fastener including a wedge with a beveled surface configured for engaging with the beveled projection block;
   the latching fastener comprising a block, a wedge and a recessed platform interconnecting the block and the wedge; wherein the block of the latching fastener retains another part of the elastic member therein, the wedge is received in the space and engagable with the projection block in the recess, and the recessed platform can abut the crossbeam whereby the latching assembly can slide along the crossbeam according to compression and decompression of the elastic member;
   wherein the elastic member can drive the latching fastener to engage with the first and second mounting portions.

10. The latching mechanism as claimed in claim 9, wherein the first mounting portion comprises a crossbeam separating the first mounting portion into a first containing portion and a second containing portion, and the latching fastener defines a recessed platform to receive the crossbeam so as to restrain movement of the latching fastener relative to the removable panel.

11. The latching mechanism as claimed in claim 10, wherein the second mounting portion comprises a projection block and a recess, said projection block is adapted to protrude from a wall of the base cover, and said recess is defined under said projection block.

12. The latching mechanism as claimed in claim 9, wherein the removable panel further comprises a plurality of detents protruded therefrom, which comprises a plurality of catches locating on the two sides of the removable panel, and two latches extending from the end of the removable panel.

13. The latching mechanism as claimed in claim 12, wherein the base cover has a compartment from one side thereof, and a plurality of slots, and two latching slots are positioned therein.

14. The latching mechanism as claimed in claim 11, wherein a post is provided in the second containing portion, the latching fastener comprises a receptacle, a wedge, and a platform interconnecting the receptacle and the wedge, the wedge is received in the second containing portion and is engagable with said projection block of the second mounting portion, one end of the elastic member is retained in the receptacle, and an opposite end of the elastic member is retained around the post.

15. The latching mechanism as claimed in claim 9, wherein the elastic member is a resilient metallic spring.

16. The latching mechanism as claimed in claim 9, wherein the latching fastener defines a groove in a top portion thereof, for facilitating manual operation.

17. A wireless communication device, comprising:
   a removable panel comprising a crossbeam lying in a space defined in the removable panel, and a post extending from an inner wall of the removable panel into the space;
   a base cover detachably retaining the removable panel therein, the base cover comprising a sidewall, wherein a projection block protrudes from an inner surface of the sidewall, and a recess is defined under the projection block; and
   a latching assembly received in the removable panel and engagable with the base cover, the latching assembly comprising a latching fastener and an elastic member, part of the elastic member being retained around the post, the latching fastener comprising a block, a wedge and a recessed platform interconnecting the block and the wedge;
   wherein the block of the latching fastener retains another part of the elastic member therein, the wedge is received in the space and engagable with the projection block in the recess, and the recessed platform can abut the crossbeam whereby the latching assembly can slide along the crossbeam according to compression and decompression of the elastic member.

18. The wireless communication device as claimed in claim 17, wherein one of the latching fastener and the removable panel defines a crossbeam, and the other thereof defines a recessed platform to receive said crossbeam so as to restrain movement of the latching fastener relative to the removable panel along directions of latching and unlatching.

19. The wireless communication device as claimed in claim 1, wherein the second mounting portion includes a beveled projection block, the latching fastener includes a wedge with a beveled surface, the bevel of the projection block engages with the beveled surface allowing the latching fastener to move towards or away the base cover.

* * * * *